United States Patent
Murphy et al.

(10) Patent No.: US 7,036,145 B1
(45) Date of Patent: Apr. 25, 2006

(54) METHOD AND APPARATUS FOR ELECTRONIC ENTERTAINMENT DEVICE ACCESS CONTROL AND INTERACTIVE RESPONSE SYSTEM

(76) Inventors: James P. Murphy, 6719 N. Jean Ave., Chicago, IL (US) 60646; John F. Nethery, 605 W. Madison St., 3112, Chicago, IL (US) 60661

(*) Notice: Subject to any disclaimer, the term of this patent is extended or adjusted under 35 U.S.C. 154(b) by 879 days.

(21) Appl. No.: 09/618,778

(22) Filed: Jul. 18, 2000

(51) Int. Cl.
*G06F 13/362* (2006.01)

(52) U.S. Cl. .................................. 726/21; 434/169

(58) Field of Classification Search ........... 434/169, 434/247, 323, 322; 713/183, 202; 726/21
See application file for complete search history.

(56) References Cited

U.S. PATENT DOCUMENTS

| | | | | |
|---|---|---|---|---|
| 5,083,271 A | * | 1/1992 | Thacher et al. | 700/92 |
| 5,716,273 A | * | 2/1998 | Yuen | 463/29 |
| 5,734,413 A | * | 3/1998 | Lappington et al. | 725/141 |
| 5,743,743 A | * | 4/1998 | Ho et al. | 434/236 |
| 5,743,746 A | * | 4/1998 | Ho et al. | 434/332 |
| 5,968,120 A | * | 10/1999 | Guedalia | 709/219 |
| 6,024,572 A | * | 2/2000 | Weyer | 434/169 |

* cited by examiner

*Primary Examiner*—Gregory Morse
*Assistant Examiner*—Andrew L. Nalven
(74) *Attorney, Agent, or Firm*—James P. Murphy; John R. Nethery

(57) ABSTRACT

An access control system for an electronic entertainment device includes a processor and a memory comprising access control instructions for execution by the processor. The instructions periodically present a set of working queries during execution of an entertainment software application, accept answers to the working queries, and allow access to, or terminate, the entertainment software application based on the answers. Access is allowed for a supervisor configurable time period for each user and each entertainment software title.

27 Claims, 4 Drawing Sheets

1. Which are denumerably infinite sets? ← 402

☐ The set of all natural numbers
☐ The set of all rational numbers
☐ The set of all real numbers

406

2. Evaluate: $4 \sum_{n=0}^{\infty} (1/4)(1/2)^n$ ← 404

[ _____ ] ⌇408

3. To whom is the following quote attributable?

*I do not know what I may appear to the world; but to myself I seem to have been only like a boy, playing on the seashore, and diverting myself, in now and then finding a smoother pebble or a prettier shell than ordinary, while the great ocean of truth lay all undiscovered before me.*

☐ James Clerk Maxwell
☐ Isaac Newton
☐ Bob Dylan
☐ Aristotle

4. Literally translated from Greek, the word *Geometry* means:

☐ Linear distance
☐ Earth measuring
☐ Great circle
☐ Parabolic arc

Submit Answers
410

METHOD AND APPARATUS FOR ELECTRONIC ENTERTAINMENT DEVICE ACCESS CONTROL AND INTERACTIVE RESPONSE SYSTEM

BACKGROUND OF THE INVENTION

The present invention relates to access control for electronic entertainment devices and interactive exchange with electronic entertainment device users. In particular, the present invention relates to a method and apparatus for controlling access to an electronic entertainment or other software device based on the results of periodically administered inquiries and exchanges.

The entertainment devices and software of today are far more sophisticated, realistic, and exciting than their ancestors. For example, modern video games and computer games routinely provide high resolution graphics, stereo sound, and 60 frame per second full screen 3D rendering. Needless to say, such games can be addicting to many users, particularly the young.

Some degree of interaction with electronic entertainment devices is undoubtedly beneficial, however. For example, an individual who must set up and configure a computer video game inevitably learns something about how to operate and configure computer hardware and software. Similarly, an individual who plays fast action games on a console may realize an increase in hand-eye coordination. As another example, adventure games are well known to develop vocabulary as well as puzzle- and problem-solving skills.

Unfortunately, the entertainment experience provided by modern video games leads many individuals to spend ever-increasing amounts of time and money playing such games as opposed to pursuing other positive pursuits, including their studies, playing with friends outside, exercising, or working. These problems are prevalent across all age groups; while teenagers may be addicted to Playstation™ Tekken 3, their parents may be addicted to computer games such as Everquest (an addiction reflected in the rampant on-line auction sales of in-game virtual items for real world money) or other software applications.

The obsessive use of entertainment devices poses a special concern, and a potential opportunity. A concern of intensive entertainment device use by children is that children will not develop social skills completely, and other interpersonal relationships which are thought to derive from non-electronic games and sports. Another concern is that entertainment time reduces the time children spend talking to their parents, and vice versa. An opportunity exists with computers, however, to allow a parent, sibling, teacher, friend, or other trusted individual to interact with the child on-line. The present invention facilitates such interaction.

A need has long existed for access control to electronic entertainment devices that addresses the problems noted above and others previously experienced.

BRIEF SUMMARY OF THE INVENTION

A preferred embodiment of the present invention provides an access control system for an electronic entertainment device. The control system includes a processor and a memory comprising instructions for execution by the processor. In particular, the instructions periodically present a set of working queries during execution of an entertainment software application, accept answers to the working queries, and allow or deny continued access to the entertainment software application based on the answers.

For instance, in a preferred embodiment, a computer game being played by a child would be periodically interrupted by the system of the present invention. The interruptions would consist of questions directed at the child for a particular purpose, e.g., SAT questions to prepare for an upcoming test. Depending on how the child answered the questions, the game could be re-accessed and would continue for varying lengths of time.

Access may be allowed for various time periods (e.g., 30 to 90 minutes) depending on the answers to the questions, the number of correctly answered questions, and the like. Thus, answering all of the queries correctly may grant the maximum time period for access to the entertainment software. At the expiration of the time period, the control system pauses the entertainment software, and presents another set of queries (which may be selected from a preloaded working query compilation, or which may include custom queries written by a local control system supervisor (e.g., a parent with password access to the control system configuration)).

Another preferred embodiment of the invention provides a method for controlling access to entertainment software executed on an electronic amusement device. The method includes the steps of periodically presenting a set of working queries during execution of an entertainment software application, accepting answers to the working queries, and allowing access to the entertainment software application based on the answers.

To this end, the method may monitor a task list of executing applications and identify execution of the entertainment software application based on the task list. As noted above, access may be allowed for a time period derived from the answers. However, the method may instead terminate the entertainment software application based on the answers (e.g., if too many answers are incorrect). The method may also identify the current user of the electronic amusement device, and present a set of working queries appropriate for the current user.

BRIEF DESCRIPTION OF THE DRAWINGS

FIG. 4 shows a set of working queries and answers.

DETAILED DESCRIPTION OF THE INVENTION

Figure 1:
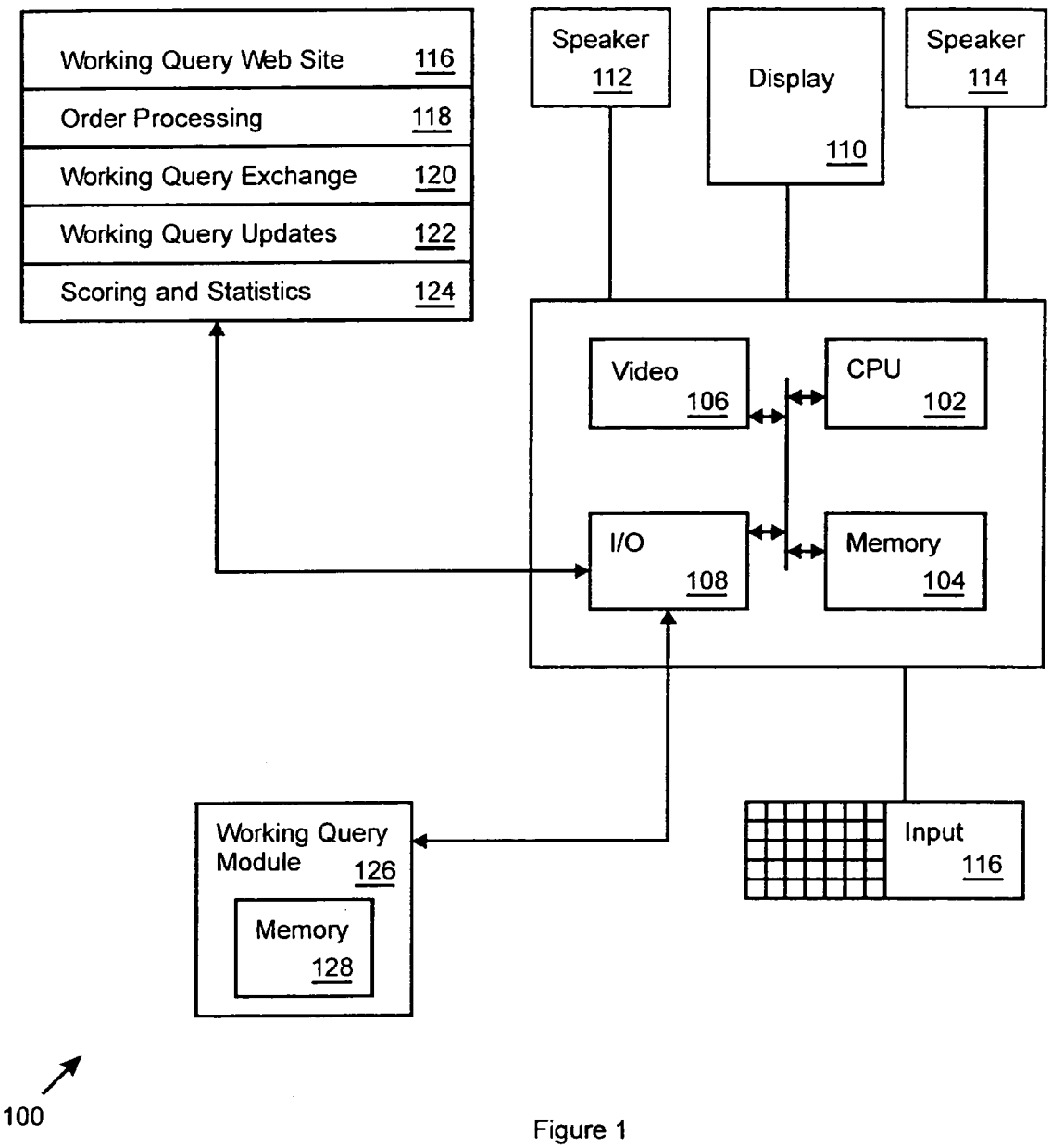
FIG. 1 illustrates an electronic entertainment device that includes an access control system.

Turning now to FIG. 1, that figure shows an exemplary embodiment of an electronic entertainment device 100. The entertainment device 100 includes a CPU 102 (e.g., a microprocessor or microcontroller) connected to a memory 104, a video controller 106, and an Input/Output controller 108. The entertainment device 100 displays entertainment software video output on the display 110, sound output on the speakers 112, 114, and accepts input on the input device 116.

The entertainment device 100 may be, as examples, a personal computer, a console gaming machine (e.g., a Playstation™ console), personal digital assistant, personal music player, or portable pocket gaming device (e.g., a Gameboy™ device). The memory 104 may be RAM, ROM, harddisk, CD, Zip™ drive, or the like, or a combination of RAM, ROM, harddisk, CD, and Zip™ drives. The I/O controller 108 interfaces input devices 116 (such as joysticks, keyboards, trackballs, lightguns, gamepads, control panels, and the like) to the entertainment device 100. The I/O controller 108 may also be responsible for certain output functions, such as serial and parallel communication.

In operation, the entertainment device 100 reads instructions from the memory 104, and accepts input from the input device 116, to control the audio/visual presentation of entertainment software on the display 110 and speakers 112–114. In addition, the memory 104 stores access control software, described in more detail below, that allows or disallows access to and interaction with any given entertainment software title. The access control software may be implemented as a separate program (e.g., a periodically executing operating system task) running out of the memory 104, or may be incorporated as software routines in the entertainment software itself. Thus, the entertainment device 100 serves as an access control system as well as entertainment system.

FIG. 1 illustrates a working query module 126. The working query module 126 represents a preferably portable hardware peripheral that, for example, couples to a serial, parallel, keyboard, or USB port of the entertainment device 100. The working query module 126 may then store working queries, answers, and configuration files in an internal memory 128 (e.g., a combination of RAM and ROM), accessed by the entertainment device 100 through the I/O controller 108. If permitted by the operating system in the entertainment device 100, the internal memory 126 may itself store access control software that operates as described in the working query module 126, or first copied to the local memory 104.

Figure 2:
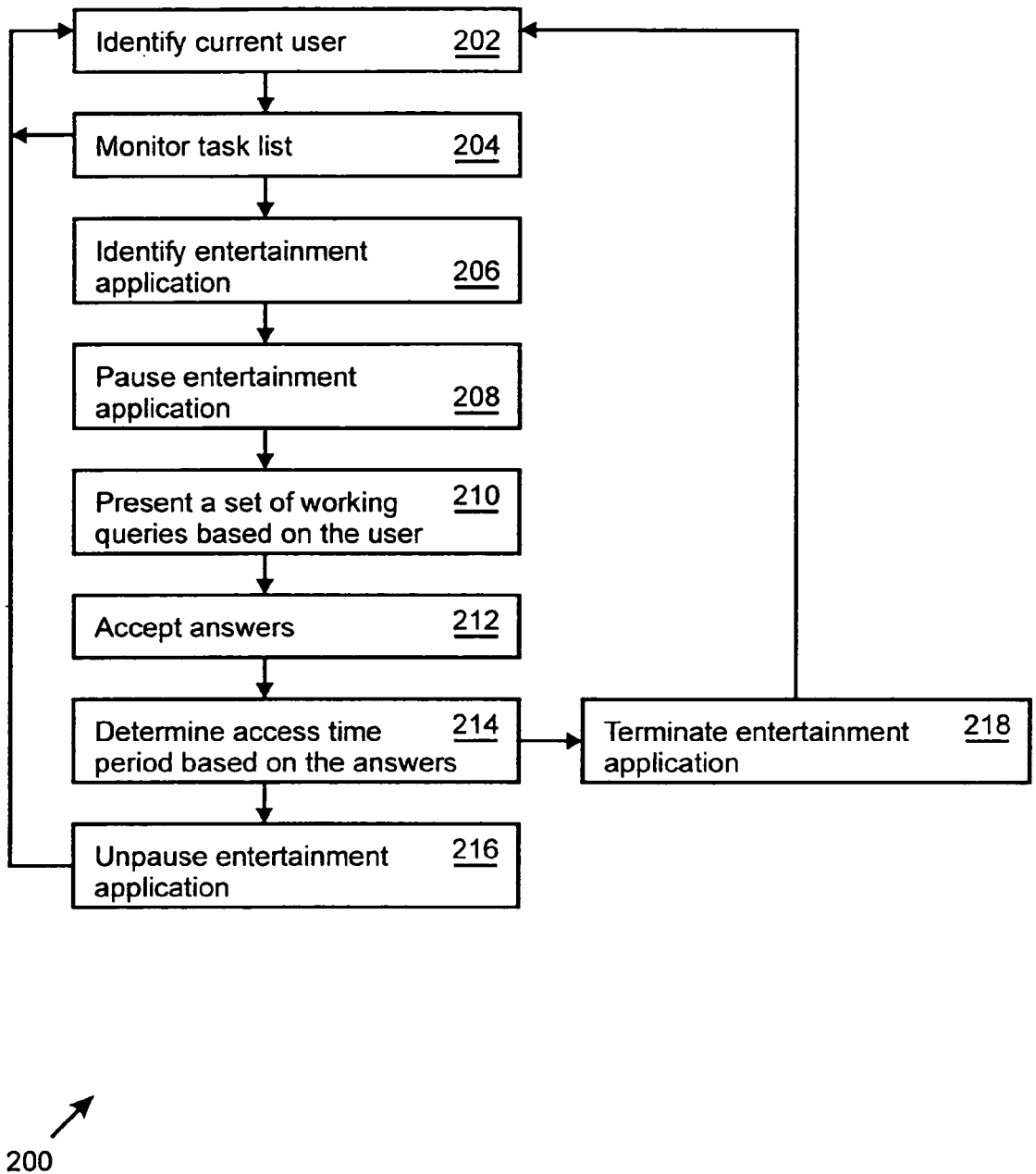
FIG. 2 shows operational steps of the access control system.

With regard to the operation of the access control system, FIG. 2 illustrates a flow diagram 200 of the access control software. At step 202, the control software identifies, if possible, the identity of the current user of the entertainment device 100. As examples, the control software may access the username of a user logged into the entertainment device 100, or a supervisor may enter the name of the individual current using the entertainment device. Other personal identification means may also be used, including, for example, the Identix Biologon™ fingerprint identification system. It is not required that the control software obtain the current user identity, however, as will be explained below.

Continuing at step 204, the control software may monitor a task list, maintained, for example, by the operating system in order to determine which applications are currently executing on the entertainment system 100. The control software compares the entries in the task list to a preconfigured file of entertainment software task list identifiers in order to determine whether a particular entertainment software title is currently executing (step 206). Thus, for example, the control software may search for the task list identifier "Planescape: Torment" to identify that the game Planescape Torment is currently executing. If no access controlled software titles are executing, the control software returns to step 202. Of course, the access control software may be set up by the supervisor to execute regardless of the specific entertainment devices game or software being utilized by the user. In other words, the access control software may execute on a predetermined periodic interval regardless of the particular application or applications that the entertainment device 100 executes.

Next, the control software continues to step 208 where the entertainment software is paused after a predetermined fixed or variable time period, or after a preselected event, e.g. after a natural pause or milestone event in the game being played. To this end, the control software may issue keyboard or control commands (e.g., ESC, spacebar, or F1) directly to the entertainment software, for example, by sending a keypress event to the entertainment software I/O handler or keyboard handler. In an alternate embodiment, the control software may issue instructions to the operating system to suspend execution of the application, using routines provided by the operating system for that purpose. The control software then executes a system routine to make its screen the top or visible screen and to take the input focus. The control software then presents a set of working queries to the user (step 210).

The working queries are preferably directed to the particular user identified at step 202. As an example, the control software may generate a set of math, science, or English working queries appropriate for a twelve year old user. However, if the control software is unable to identify the user, then the control software may instead present a set of working queries according to an expected user for the particular software title. The expected user may be input during configuration by a supervisor and stored in a file in the memory 104.

The working queries are generally, though not necessarily, educational questions. Thus, the working queries may relate to concepts in math, science, history, geography, language, and the like. The working queries may also pose questions relating to such topics as drugs or teen sex that are often difficult to discuss in person, thus prompting a meaningful information exchange and future discussions. Other possible working queries topics include, as examples, auto repair, sewing, plumbing, mixology, legal concepts, ACT or LSAT questions, and the like. In general, the goal is to ensure that the user demonstrates some level of knowledge with respect to one or more predetermined subject areas before being allowed to continue to interact with the entertainment software.

The number of working queries, their subject matter, and the frequency for presenting each set of working queries are generally preconfigured parameters set by a supervisor for each, entertainment software title, and each user, and stored in the memory 104. In general, the memory 104 may store a large database of working queries (and their correct answers), and may further store custom queries (and their correct answers) designed and entered manually by the supervisor. Thus, the supervisor may ask even an abstract question of their children such as "How do you feel today?". The "correct" answer may then be any answer. Working queries may be selected out of the database of working queries randomly or in order in a single topic, or across topics.

Continuing at step 212, the control software accepts answers to each working query. The answers may be provided through text input boxes, multiple choice check boxes, and the like. Voice recognition software may also be provided to expedite the query answer process. Then, at step 214, the control software determines an allowed access time period based on the answers. Thus, for example, more queries answered correctly may result in longer access time. Alternatively, as another example, a threshold pass number of correct answers may be required to obtain a predetermined access time. Once the time period is determined, the control software un-pauses the entertainment application (step 216) and returns control to the user. The control software may then schedule itself to execute again at the expiration of the time period. After the time period expires, the control software proceeds as noted above to present the next set of working queries to the user.

On the other hand, the control software may also determine whether the number of correct answers falls below a threshold failure number of correct answers. If such is the case, the control software may then terminate the entertainment application (step 218). To that end, the control software may present the set of working queries within a short time period (e.g., one minute), of the execution of the entertainment software, with subsequent presentation of working queries every 30–90 minutes thereafter.

Optionally, the control software may correct incorrect answers, explain the correct answer, or provide other pertinent feedback for each working query. Thus, for example, a working query on the long term effects of the drug use may present statistics, video or audio clips, web pages, text files, and the like that reinforce the concepts underlying the working query.

Although the flow diagram in FIG. 2 shows that the control software continually loops back to step 202, it is envisioned that the control software may instead be periodically executed by the operating system, or alternatively, that the control software pauses for a predetermined amount of time before each iteration. With each iteration, the control software may gather statistics for access by the supervisor on the entertainment applications played, the amount of time played, the user identification, the number and type of queries presented, their answers, the proportion of correct answers, and the like.

Figure 3:
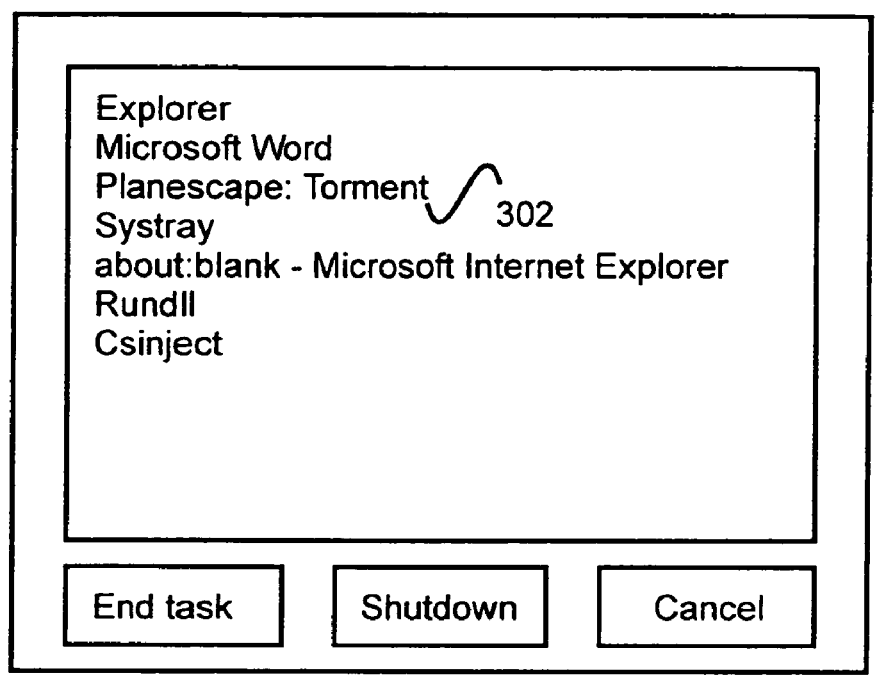
FIG. 3 shows task list identifiers of executing applications in a task list format.

Turning next to FIG. 3, that figure provides an example of task list identifiers of executing applications in the task list 300. Note that the task list identifiers in this example are text strings such as the task list identifier 302 for "Planescape: Torment". In other embodiments, the task list identifiers may be non-readable encoded identifiers other than text strings. In general, however, the task list identifiers provide a mechanism by which the processor 102 may identify the programs and the like executing on the entertainment device 100.

FIG. 4 shows an example of a set of working queries 400, including the first query 402 and the second query 404. Note that answers may be provided using checkboxes (e.g., the checkbox 406), text fields (e.g., the text field 408), and the like. When the user has entered answers to the questions, for example by clicking the appropriate check boxes and entering text in the text field, the user than clicks on the Submit Answers button 410. The control software then records the answers and presents additional working queries until a preselected number of working queries has been presented and answered. As noted above with respect to FIG. 2, the control software scores the answers and determines an access time for the entertainment software based on the answers.

Turning again to FIG. 1, that figure also shows a working query web site 116. The working query web site 116 generally runs on a dedicated remote web server connected via the I/O controller 108 to the entertainment device 100. To that end, the I/O controller 108 may include a modem or direct network (e.g., a T1 connection, wireless access, etc.) to the Internet. In operation, the working query web site 116 provides an Order Processing web page 118 which allows the owner of the entertainment device to be billed in exchange for the ability to download additional working queries, for example, to maintain a database of current event working queries in the entertainment device 100. It is also envisioned, however, that additional working queries may be added using a floppy or CD-ROM, for example, connected directly to the entertainment device 100.

The working query web site 116 also includes a Working Query Exchange page 120. The Working Query Exchange page 120 accepts uploaded custom working queries and answers from individuals (e.g., by uploading files containing the working queries from the entertainment device 100, or by direct text entry), stores the uploaded working queries, and provides and creates hyperlinks to the uploaded working queries and answers. Other individuals may then download the working queries and answers by selecting the links with their web browser. Additionally, the working query web site may provide a Working Query Update page 122 that provides corrections or additions to working queries previously downloaded by an individual. Also shown as part of the working query web site 116 is a Scoring and Statistics page 124. The Scoring and Statistics page 124 may gather statistics from the entertainment device 100, including the number of working queries answered correctly, the age group answering the working queries, the time required to provide an answer, and the like. The Scoring and Statistics page 124 may then present the statistics gathered in regional or national summaries and averages, for example.

The control software may analyze an answer typed into a text field for certain keywords, phrases, equations, numerals, or other indicia to determine a degree of correctness for the answer. As an example, a working query may state "Describe the three regions of the solar atmosphere." The keywords that should be included in the answer include "photosphere", "chromosphere", and "solar corona". A predetermined unit of access time may be given for each keyword present in the answer, or full access time may be given if more than a threshold number of keywords are present. Optionally, the control software may run a spelling or grammar check on the answer to add time (or remove time) for fewer than a predetermined number of spelling and grammar mistakes (or for more than a predetermined number of spelling and grammar mistakes). In addition, feedback is preferably provided to explain the concepts underlying the keywords that the answer did not contain.

Thus, the present access control system and software provide a mechanism by which interaction with entertainment software may be balanced with educational or other goals. Exceptional performance may be rewarded with extended access time, while unacceptable performance may result in denial of access to the entertainment software altogether.

As the discussion above indicates, the access control system may be implemented in a highly configurable fashion. As examples, the supervisor may set and modify the number of working queries, their subject matter and difficulty, and the frequency for presenting each set of working queries for each entertainment software title and each user. Additional configurable parameters include the task list names for the entertainment software titles to be access limited, the user identifications which are subject to access limitations, the names of the databases from which working queries are chosen, the time period for which access is granted, the number of incorrect answers that will terminate the entertainment application, and the incremental access time period allowed for each correct answer. Each option is preferably stored in one or more configuration files in the memory 104.

It is also noted that there may be a hierarchy of supervisors having a corresponding hierarchy of passwords. In other words, a parent may have the highest level of supervisory authority and have access to all the configuration options provided by the access control system while a child may have a secondary level of authority. Thus, a child may also configure a set of working queries for the parent and the entertainment software that a parent uses. This possibility encourages exchanges of information between the child and the parent on topics that the child may be quite self-conscious about. Although the parent, at the top of hierarchy, may be able to reconfigure any options and working queries the child has set, the general hierarchy also allows an individual with one level of authority (e.g., a brother) to set working options and working queries without interference from another individual with the same level of authority (e.g., a sister).

While the invention has been described with reference to a preferred embodiment, it will be understood by those skilled in the art that various changes may be made and equivalents may be substituted without departing from the scope of the invention. For example, the access control system may limit access to applications other than entertainment applications, for example general purpose web browsers, by monitoring for the signature of any particular application in the task list. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. An access control system for an electronic entertainment device, the control system comprising:
    a processor;
    a memory comprising instructions for execution by the processor for:
        periodically presenting working queries in response to execution of an entertainment software application;
        accepting answers to the working queries;
        allowing access to the entertainment software application based on the answers;
        exchanging selected working queries and answers through a working query exchange server, thereby obtaining additional working queries from the working query server; and
        adding the additional working queries to a database of working queries in the access control system.

2. The control system of claim 1, wherein the instructions for allowing access comprise instructions for allowing access to the entertainment software application for a time period derived form the answers.

3. The control system of claim 2, wherein the time period increases as a number of the answers that are correct answers increases.

4. The control system of claim 1, wherein the memory further comprises instructions for monitoring a task list of executing applications and identifying execution of the entertainment software application based on the task list.

5. The control system of claim 1, wherein the working queries include custom queries written by a local control system supervisor.

6. The control system of claim 1, wherein the memory further comprises instructions for pausing the entertainment software application before presenting the set of working queries.

7. An access control program product for controlling access to entertainment software executed on an electronic amusement device, the product comprising:
    a storage medium;
    an access control application stored on the storage medium, the access control application comprising software instructions for:
        periodically presenting working queries in response to execution of an entertainment software application;
        accepting answers to the working queries;
        allowing access to the entertainment software application based on the answers;
        exchanging selected working queries and answers through a working query exchange server, thereby obtaining additional working queries from the working query server; and
        adding the additional working queries to a local database of working queries.

8. The access control program product of claim 7, wherein the instructions for allowing access comprise instructions for allowing access to the entertainment software application for a time period derived from the answers.

9. The access control program product of claim 8, wherein the time period increases as a number of the answers that are correct answers increases.

10. The access control program product of claim 7, wherein the memory further comprises instructions for monitoring a task list of executing applications and identifying execution of the entertainment software application based on the task list.

11. The access control program product of claim 7, wherein the access control application further comprises software instructions for identifying a current user of the electronic amusement device, and wherein the software instructions for presenting comprise software instructions for presenting the set of working queries based on the current user.

12. A method for controlling access to entertainment software executed on an electronic amusement device, the method comprising:
    periodically presenting working queries in response to execution of an entertainment software application;
    accepting answers to the working queries;
    allowing access to the entertainment software application based on the answers;
    exchanging selected working queries and answers through a working query exchange server, thereby obtaining additional working queries from the working query server; and
    adding the additional working queries to a local database of working queries.

13. A method according to of claim 12, further comprising the steps of monitoring a task list of executing applications and identifying execution of the entertainment software application based on the task list.

14. A method according to claim 12, further comprising the step of determining a time period derived form the answers for which to allow access to the entertainment software.

15. A method according to claim 12, further comprising the step of terminating the entertainment software application based on the answers.

16. A method according to claim 15, wherein terminating comprises terminating the entertainment software application based on a predetermined number of the answers that are incorrect answers.

17. A method according to claim 16, further comprising the step of identifying a current user of the electronic amusement device, and wherein presenting comprises presenting the set of working queries based on the current user.

18. The access control program product of claim 7, where the storage medium further comprises instructions for accessing working query scoring and statistics data gathered and summarized across a geographic region on the working query server.

19. The access control program product of claim 7, where the storage medium further comprises instructions for:
- establishing a supervisor hierarchy comprising a parental authority level and a child authority level which controls access to configuration options of the access control application.

20. The access control program product of claim 7, where the storage medium further comprises instructions for:
- establishing a supervisor hierarchy; and
- controlling access to configuration options for the access control application based on the supervisor hierarchy.

21. The access control program product of claim 20, where the supervisor hierarchy comprises a highest level of authority for a parent and a secondary level of authority for a child.

22. The access control program product of claim 7, where obtaining selected working queries comprises purchasing the selected working queries.

23. The program product of claim 20, where the supervisor hierarchy comprises a highest level of authority for a parent and a lower secondary level of authority.

24. An access control program product for controlling access to entertainment software executed on an electronic amusement device, the product comprising:
- a storage medium;
- an access control application stored on the storage medium, the access control application comprising software instructions for:
  - determining that an access controlled program is executing;
  - presenting a working query chosen from a local working query database in response to determining that the access controlled program is executing;
  - accepting an answer to the working query;
  - determining whether to permit access to the access controlled program based on the answer; and
  - supplementing the local working query database by exchanging selected working queries and answers through a working query exchange server.

25. The program product of claim 24, where the storage medium further comprises instructions for terminating the access controlled program based on the answer.

26. The program product of claim 24, where the storage medium further comprises instructions for:
- establishing a supervisor hierarchy; and
- controlling access to configuration options for the access control application based on the supervisor hierarchy.

27. The program product of claim 26, where the supervisor hierarchy comprises a parental authority level and a child authority level.

* * * * *